United States Patent
Alkhalaileh et al.

(10) Patent No.: US 10,364,615 B2
(45) Date of Patent: Jul. 30, 2019

(54) BRAZED POLYCRYSTALLINE DIAMOND COMPACT

(71) Applicant: Suzhou Shalebreaker New Material Technology Co Ltd, Suzhou (CN)

(72) Inventors: Samer Alkhalaileh, Dublin, OH (US); Yuming Jiang, Sozhous (CN)

(73) Assignee: Suzhou Superior Industrial Technology Co. Ltd., Suzhou, Jiangsu (CN)

( * ) Notice: Subject to any disclaimer, the term of this patent is extended or adjusted under 35 U.S.C. 154(b) by 827 days.

(21) Appl. No.: 14/539,494

(22) Filed: Nov. 12, 2014

(65) Prior Publication Data

US 2016/0130883 A1    May 12, 2016

(51) Int. Cl.
| | | |
|---|---|---|
| *E21B 10/573* | (2006.01) | |
| *B24D 3/00* | (2006.01) | |
| *B24D 18/00* | (2006.01) | |
| *B24D 3/06* | (2006.01) | |
| *C22C 26/00* | (2006.01) | |
| *B22F 7/06* | (2006.01) | |
| *B23K 35/22* | (2006.01) | |
| *B22F 5/00* | (2006.01) | |

(52) U.S. Cl.
CPC .......... *E21B 10/5735* (2013.01); *B22F 7/064* (2013.01); *B23K 35/22* (2013.01); *B24D 3/007* (2013.01); *B24D 3/06* (2013.01); *B24D 18/0009* (2013.01); *C22C 26/00* (2013.01); *B22F 2005/001* (2013.01)

(58) Field of Classification Search
CPC ...... B24D 18/0009; B24D 3/007; B24D 3/06; C22C 26/00; E21B 10/5735
See application file for complete search history.

(56) References Cited

U.S. PATENT DOCUMENTS

| | | | | |
|---|---|---|---|---|
| 4,767,050 A | * | 8/1988 | Flood | B23K 35/302 175/433 |
| 5,351,772 A | * | 10/1994 | Smith | E21B 10/5735 175/428 |
| 9,260,923 B1 | * | 2/2016 | Bertagnolli | E21B 10/567 |
| 2006/0266558 A1 | * | 11/2006 | Middlemiss | B22F 7/062 175/426 |

* cited by examiner

*Primary Examiner* — Shuangyi Abu Ali
(74) *Attorney, Agent, or Firm* — Taylor Intellectual PLLC; James W. Taylor, II

(57) ABSTRACT

A thermally stable polycrystalline diamond compact is created by (i) preforming an annular thermally stable polycrystalline from a diamond plate, (ii) preforming a substrate with a projection that has an interfacial mating surface that is a negative topology of the annular thermally stable polycrystalline, (iii) and brazing the two components together. The resulting polycrystalline diamond compact can be made thermally stable because cobalt and other catalysts can be leached out of the thermally stable polycrystalline. The thermally stable polycrystalline can be attached to the substrate by brazing, which due to the topology of the thermally stable polycrystalline and the substrate with a projection will unexpectedly have sufficient blaze shear strength to be used in demanding applications.

10 Claims, 4 Drawing Sheets

BRAZED POLYCRYSTALLINE DIAMOND COMPACT

This application claims priority under 35 U.S.C. 119(e) based upon Provisional Application Ser. No. 61/903,042, entitled BRAZED POLYCRYSTALLINE DIAMOND COMPACT, filed Nov. 12, 2013. This provisional application is incorporated herein by reference in its entirety.

FIELD OF THE INVENTION

The present invention relates to a polycrystalline diamond compact ("PDC") with a raised substrate projection, an annular thermally stable polycrystalline ("TSP") that wraps around the substrate projection, and a braze layer of material acting as the interface of the substrate and the TSP. As will be discussed below, the invention was developed for the oil and gas field drilling industry, but can nevertheless be utilized in virtually any field that requires drilling and/or machining.

BACKGROUND OF THE INVENTION

PDCs and other ultra-hard compacts have been used for many years in drilling and machining. These compacts are a construction of two components: an ultra-hard "plate" and its attached substrate. In use the compact or the part to be machined is rotated at high speeds. The plate is hard and abrasive by nature, such that when it makes contact with a material while the compact or part to be machined is rotating, it grinds away that material. The substrate serves two major purposes: (i) it acts as a shock absorber, protecting the plate from impacts; and (ii) it acts as an interface between the plate and the rest of the tool by creating a physical connection.

Connecting the plate to the substrate is traditionally performed as a sintering operation. In this process, a compacted ultra-hard powder (e.g., diamond powder) is placed into a heat and pressure mold of the final compact. The substrate is placed into the mold on top of the powder. The mold is sealed. Large amounts of heat—enough to generate a temperature of about 1400° C. to 1500° C.—and large amount of pressure—roughly 500,000 psi to 1,000,000 psi—are applied, which causes the powder to compress and the binder in the substrate—which is generally metallic based, commonly using a tungsten carbide matrix and cobalt binder—to melt, allowing the substrate's materials to sweep (i.e., permeate and fill the interstitial spaces) through the diamond powder. Cobalt metal is often used as a catalyst additive in the substrate because it catalytically promotes surface-to-surface bonds between diamond grains. The bonds formed are generally traditional $sp^3$-hybridized, tetrahedral carbon-to-carbon bonds found in diamond creating a diamond-skeleton plate. This locks the shape of the plate, creating particles having bonds to adjacent particles. Localized pockets (due to filled interstitial spaces from the powder) are filled with binder or a carbide of the binder due to reaction with graphite formed from the diamond as a byproduct of this process. The net result is a dramatic increase in abrasion resistance under atmospheric conditions because of this catalyst.

A conventional end product is shown in FIGS. 1 and 2. PDC 100 comprises a diamond plate 110 and a substrate 120. The diamond plate has a rake 114—that is not responsible for cutting but instead helps remove cut material—and flank 112, which performs abrasion. The diamond plate 110 and the substrate have an interface 130.

Compacts made by this method demonstrate excessive wear. In use, these compacts are exposed to friction-inducted and environment-induced high temperatures, such as 700° C. or even higher. Such high temperatures will cause thermal expansion of compact. The binder's catalyst—such as cobalt, which as noted above is important for manufacture—generally has a significantly higher coefficient of thermal expansion ("CTE") than diamond. Therefore, during use at high temperatures, large amounts of internal stress are put into the compact. This causes micro-cracks in the plate and results in significantly higher deterioration in abrasion resistance than would otherwise be demonstrated, increasing the probability of failure.

In order to overcome this deficiency, using a catalyst that has a similar CTE as diamond would obviate this concern. Silicon, for example, reacts with the diamond during the high temperature and high pressure step of compact sintering to form silicon carbide. Both silicon and silicon carbide exhibit a CTE relatively similar to diamond. Therefore, the resultant compact is considered thermally stable because it can withstand temperatures as high as 1100° C. without significant deterioration of abrasion resistance. (See U.S. Pat. No. 8,020,644, which is incorporated herein by reference.) However, PCD made utilizing silicon as a binder does not have similar properties to PCD made utilizing catalytic cobalt. Instead of forming diamond-to-diamond $sp^3$ bonds between adjacent diamond grains (through bridges based on carbon-carbon bonds), the large majority of diamond grains are attached to each other through silicon bridges based off of silicon-carbon bonds. While carbon atoms at the surface of adjacent diamond grains may still form carbon-carbon bonds due to limited graphitization, silicon acts as the major bridge linking the diamond grains together. Silicon-carbon bonds have significantly less strength than the carbon-carbon $sp^3$ bonds, and therefore the overall structure of the TSP formed with silicon binder is weaker than that formed utilizing catalytic cobalt.

Another method of overcoming the different CTE of the binder's catalyst and the diamond in the face is catalyst-leaching (e.g., an acid treatment to leach cobalt). This method has been performed such that little-to-no cobalt remains in the plate. This technique has been shown to significantly improve plate thermal effects on abrasion resistance of the plate, at the cost of increasing the brittleness of the plate. (See U.S. Pat. Nos. 4,104,344, 4,288,248, and 8,020,644, all of which are incorporated by reference.) This is one method to achieve a thermally stable polycrystalline ("TSP"). However, this method also deteriorates the usually-metallic substrate due to acid corrosion. Therefore, care should be taken to protect the substrate from acid corrosion while leaching the PDC, or other manufacturing steps are necessary in order to prepare the leached compact for use.

Using a high temperature, high pressure process ("HTHP") again to add a new substrate would reintroduce cobalt back into the plate. This would render the leaching step insignificant. Therefore, this is not a reasonable method.

Attachment of the two components can be done using a braze joint (FIG. 3). PDC 300 comprises diamond plate 310 and substrate 320. The diamond plate 310 has rake 314 and flank 112. Importantly braze 332 connects substrate 320 and diamond plate 310, acting as an interface and mechanical attachment mechanism. However, conventional braze joints like braze 332 do not provide adequate bond strength between the plate and the substrate. In particular, the shear strength for a commercially available braze is between 20,000 and 35,000 psi. Such bond strength is insufficient for demanding applications, such as subterranean drilling.

Therefore relying solely on the conventional braze joint to provide adequate bond strength to hold both components together is insufficient and not desirable. It is also desirable to improve the attachment strength between a TSP plate and the substrate to allow the compact to handle demanding applications.

SUMMARY

In one embodiment of the present invention, a process of manufacturing a thermally stable polycrystalline diamond compact comprises: creating a substantially annular thermally stable plate that has an interface surface; machining a substantially cylindrical substrate that has an non-planar interface surface; applying a molten braze paste to the interface surfaces between the plate and the substrate, and allowing the molten braze paste to harden to form the compact by bonding the plate to the substrate; wherein the plate's interface surface is a bottom surface of the plate and penetrates orthogonally through the annular hole of the plate, and the substrate's interface surface is a top surface of the substrate that is substantially an inverted topology of plate's interface surface such that when the molten braze paste is applied, the two components become a mated pair with at least a portion of the substrate in the annular hole of the plate's top surface.

In another aspect of the invention, a thermally stable polycrystalline diamond compact comprising: (a) a substantially annular thermally stable plate that has an interface surface; (b) a substantially cylindrical substrate that has an non-planar interface surface; (c) a braze joint at the interfacial surfaces between the plate and the substrate such that the plate and the substrate are brazed together; wherein the plate's interface surface is a bottom surface of the plate and the orthogonal inner annular surface, and the substrate's interface surface is a top surface of the substrate that comprises an projection that is substantially an inverted topology of plate's interface surface such that when the braze paste is applied, the two components become a mated pair with at least a portion of the substrate's top surface projecting into an inner annular region of the plate and not being mated with the plate.

In yet another aspect of the invention, a method of using the invention is protected.

BRIEF DESCRIPTION OF THE DRAWINGS

The features of the present invention will best be understood from a detailed description of the invention. The figures herein are discussed throughout this specification but are briefly summarized here.

DETAILED DESCRIPTION

Figure 1:
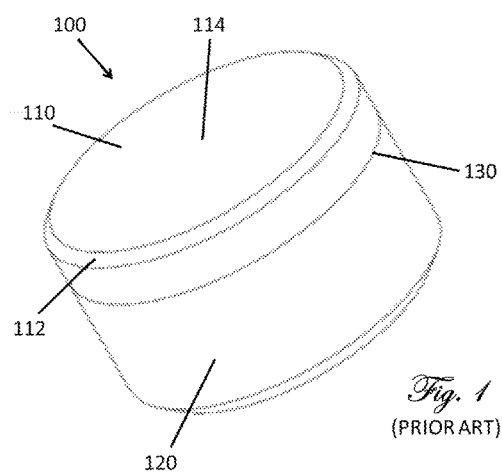
FIG. 1 is a perspective view of a conventional PDC.

For the purpose of promoting an understanding of the principles of the claimed technology and presenting its currently understood best mode of operation, reference will be now be made to the embodiments illustrated in the drawings and specific language will be used to describe the same. It is nevertheless to be understood that no limitation of the scope of the claimed technology is thereby intended, with such alterations and further modifications in the illustrated device and such further applications of the principles of the claimed technology as illustrated therein being contemplated as would typically occur to one skilled in the art to which the claimed technology relates.

In this discussion, the term "substantially cylindrical" shall be construed to mean shapes that are derived from cylinder that may have material removed from edges to smooth the edge or change the edge from a 90° angle to having a flank with two 45° angle to more complicated flanks Additionally the term is meant to include shapes that have shapes cut into the cylinder as long as the skilled artisan would still recognize that the shape in question would be easily created by first creating a cylinder and then machining the cylinder.

Figure 4:
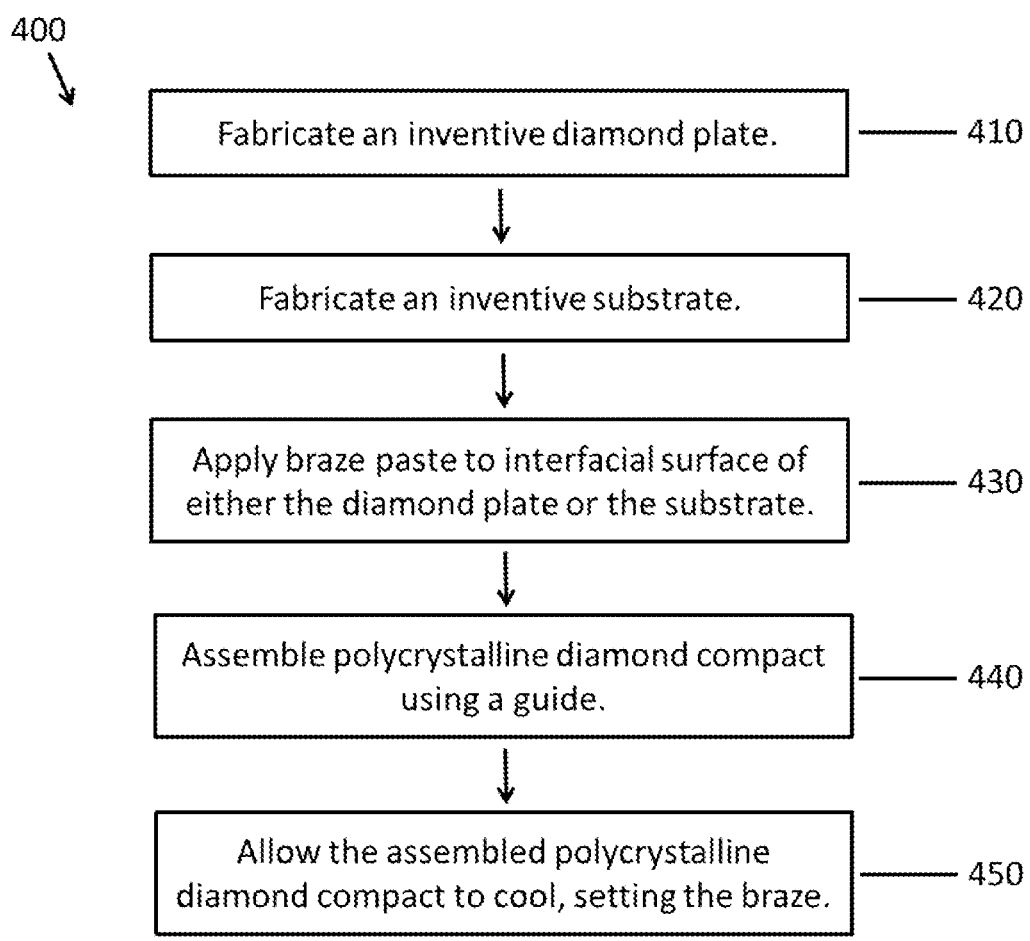
FIG. 4 shows an exploded view of an exemplary PDC assembly according to the present invention.

Referring now to FIG. 4, an embodiment of the present invention is shown. Fabrication method 400 comprises several steps to create the PDC. A first step 410 is to fabricate the TSP according to the present invention (explained below). Another step 420 is performed independently of step 410—illustrated as after, but step 420 may be done simultaneously or before step 410. Step 420 is to fabricate a substrate according to the present invention (explained below). Once the TSP and substrate are created, then step 430 may be performed, which is to apply a braze paste to at least one of the substrate's or TSP's interfacial surface. Once the braze paste is applied, step 440 may be performed, which is to assemble the unbrazed PDC using a guide. Once assembled, the final brazing step 450 can be performed to create a PDC according to this embodiment of the present invention by allowing the PDC to cool, which sets the braze.

An exemplary embodiment of the method may comprise the following additional steps: a step of placing the treated PDC on a holder inside a plasma vapor deposition ("PVD") reactor suitable for diamond coating; a step of plasma etching the surface layer of the PDC using a first feed-gas mixture of oxygen, hydrogen and argon; a step of coating the PDC with a first layer of diamond material inside the deposition reactor using a second feed-gas mixture comprising of about 1-20 volume percent methane and 80-99 volume percent hydrogen, and maintaining the surface temperature of the PDC at a first predetermined temperature for a sufficient period of time; and a step of coating the PDC with a second layer of nanodiamond in the feed-gas mixture obtained by adding an amount of nitrogen to the mixture used in step, such as to keep the ratio of nitrogen to methane concentrations of about 5-20, and maintaining the surface temperature of the PDC at a second predetermined temperature. Naturally any coating technique may be used in lieu of PVD, such as chemical vapor deposition, or plasma deposition.

Figure 5:
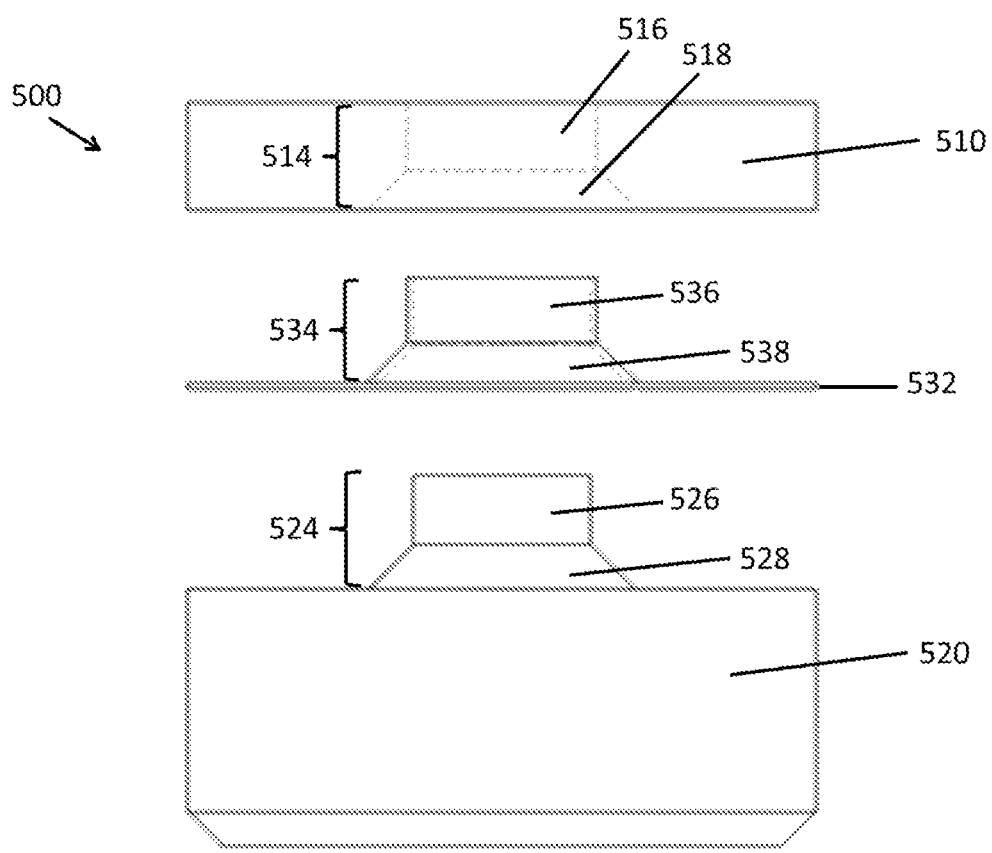
FIG. 5 illustrates a flow chart summarizing an assembly method for an exemplary PDC according to the present invention.

Referring to FIG. 5, an inventive PDC 500 has three major elements: an annular TSP 510, a substrate 520, and a braze 532. An assembled PDC 500 is roughly cylindrical in shape with the various components being stacked on each other as one looks down the axis of the cylinder. Some deviations in geometry may be appropriate, especially deviations that have patterns or symmetry around the axis of the cylinder.

TSP 510 has inner annular void 514 penetrating the diamond plate 510 down the cylindrical axis. The inner annular void 514 has two distinct regions: a simple annular region 516 and a flared annular region 518. While the annular void 514 is not symmetrical orthogonally to the cylindrical axis, it has rotational symmetry around the cylindrical axis.

Substrate 520 has projection 524, which in turn comprises a flared segment 528 and a cylindrical segment 526. The projection 524 is an inverted topology of annular void 514, except the projection 524 is slightly smaller than the annular void 514 to account for the thickness of braze 532. The projection 524 and the annular void 514 are designed to mate upon brazing, wherein each segment projection mates with its opposing annular void segment, i.e., simple annular region 516 mates with cylindrical projection segment 526 and flared annular region 518 mates with flared projection segment 528.

The interfacial surface of the substrate 520 is the top surface of the substrate and the circumferential region around the projection 524. The interfacial surface of the TSP 510 is the bottom surface of the TSP 510 and the inner surface of the annular void 514. Braze 532 acts as the attaching material so that upon assembly substrate 520 and TSP 510 are brazed together to form a coherent unit. Braze 532 is generally applied as a molten paste on the interfacial surface of substrate 520, and therefore, it molds to features of the interfacial surface of substrate 520. For example, it retains the shape of projection 524 as molded projection 534, which additionally comprises molded cylindrical projection 536 and molded flared projection 538 that are molded from cylindrical projection 526 and flared projection 528 respectively. Braze 532 is a thin and uniform interface layer, so TSP 510 can be applied to the top of braze 532 prior to any hardening, and the braze will adhere substrate 520 to TSP 510 to create a uniform polycrystalline diamond compact 500. In this embodiment, the top of projection 524 is flush with the top of the diamond plate 510 when assembled and brazed. Therefore, the top surface of projection 524 acts as at least part of the rake of the PDC 500.

After the PDC 500 is completed, the PDC 500 may be machined to plane the top surface (the diamond plate end of the cylinder). 0.05 mm of material or more down the cylindrical axis of the PDC may be removed. Preferably about 0.25 mm is removed. Planing ensures proper geometry between the top surface and the PDC's outer circumferential walls, which controls the angle and shape of the cutting edge or flank.

Thermally Stable Polycrystalline

In the present invention, the term "thermally stable polycrystalline" (or "TSP") is to be understood to be an ultra-hard and thermally-stable component used as a PDC's plate. Traditional PDCs (such as those discussed in the background) may or may not be thermally stable and therefore they may or may not be TSPs. TSPs according to the present invention are annular in geometry.

In the context of this invention, the term "annular" is meant to convey any shape that has cross sections along the cylindrical axis that is ring-shaped. The cross sections need not be the same shape.

Further, in this discussion "diamond plate" may refer to a machined TSP or it may refer to a simple polycrystalline diamond. In general, diamond plate will refer to a TSP in the context of the diamond plate being joined with another subcomponent of the PDC, such as the braze or substrate. Further, it may refer to a TSP when it's discussing final machining of a diamond plate before brazing or assembly with other components. Otherwise, it will generally refer to a simple polycrystalline diamond material that may or may not have a significant shape. Further, the diamond plate, while generally diamond, may be another material, such as cubic boron nitride.

As described above, manufacturing polycrystalline diamond generally involves the compression of diamond particles under HTHP. Compression may occur at room temperature, which could result in reduction of interstitial spaces due to crushing, sliding, stacking, or other aggregation of diamond particles. Due to the complicated pressure system of having so many particles compressing each other, there may be local areas of high pressure and other local areas of low pressure. Yet some diamond crystal may graphitize as temperature of such regions increases. Further, as the substrate's binder melts, it may sweep through the diamond particles. In addition, as known in the art, catalyst may facilitate diamond formation via carbon translocation and promotion of bonding. Thus, the presence of catalyst in molten solution generally promotes the formation of diamond-to-diamond bonds in adjacent diamond particles, resulting in formation of a coherent skeleton of bonded diamond particles. Any known catalyst in the art may be used for this purpose. Preferably the catalyst is a group VIII metal or alloys thereof. More preferably the catalyst is cobalt or an alloy of cobalt. The most preferred catalyst is metallic cobalt. TSPs formed from these polycrystalline diamond plates will be known as diamond-skeleton TSPs in this disclosure owing to high carbon-carbon bond density.

Further, polycrystalline diamond manufacturing may involve compressing mixtures of diamond particles and elements or alloys containing elements which react with carbon to form stable carbides to act as a bonding agent for the diamond particles. Silicon, titanium, tungsten, molybdenum, niobium, tantalum, zirconium, hafnium, chromium, vanadium, scandium, boron, and alloys thereof are suitable bonding agents. Because of their affinity for carbon, the bonding agent elements react extensively or completely with the diamond particles to form interstitial carbide phases, which provide a strong bond between the diamond crystals. Moreover, graphite formation is kinetically slower than graphite to carbide conversion during the heating process, and therefore graphite is generally not observed given that it is generally converted to carbides as it is formed. This stable carbide phase surrounds individual diamond crystals and bonds them to form a dense, hard compact. While these carbide phases may covalently link diamond particles, these carbide bonds are weaker than the $sp^3$ hybridized carbon-carbon bonds witnessed in diamond-skeleton TSPs, and therefore create a weaker TSP. TSPs made in this fashion—mainly without a carbon-carbon bond-forming catalyst—will be known as carbide-bound TSPs in this disclosure owing to the large role carbides play in maintaining TSP integrity.

The particle size of the diamond particles used to fabricate the polycrystalline diamond play important scientific and financial roles in the manufacture of the polycrystalline diamond. In general, any particle sizes may be used. As would be understood by the skilled artisan, the particle size would control the friction created by use (and therefore the heat), the amount of material abraded in use, and wear characteristics of a resulting PDC. Course particles (a particle size of at least 100 µm, preferably from about 100 to 150 µm), fine particles (a particle size of 50 µm or less, preferably a particle size of 10 to 30 µm), their mixtures, and other particle size distributions may be used. TSPs made from coarse diamond particles are known to abrade faster than TSPs made from fine diamond particles, but they generally create more heat than the TSPs made from fine diamond particles.

A polycrystalline diamond must be converted to a TSP for the purposes of the present invention. Carbide-bound TSPs are inherently a TSP without additional processing because carbides generally have a similar CTE to diamond, and therefore the thermal expansion characteristics do not hurt abrasion resistance at elevated temperatures generally experienced during use. Diamond-skeleton TSPs generally require a leaching operation after the molding of the polycrystalline diamond is finished in order to form the TSP. That is because in this case, the catalyst will generally have a significantly different CTE than diamond, causing deteriorating effects under abrasion when in use at elevated temperatures. Once leached, the problem is solved and the abrasion resistance becomes significantly more resistant to temperature.

The leaching step is generally performed as an acid etching step. Nitric acid, hydrochloric acid, hydrofluoric acid, sulfuric acid, hydrobromic acid, hydroiodic acid, perchloric acid, chloric acid, organic acids, or any other art recognized acid may be used to leach out the catalyst. After leaching, washing with water or another solvent is performed to remove any residual acid.

In general, carbide-bound TSPs are weaker than diamond-skeleton TSPs due to lower carbon-carbon bond density. This is theoretically expected because carbides—having a hardness of around 9—generally have a lower hardness than diamond—having a hardness of 10—on Mohs harness scale. The changes in the binder of the TSP would be expected to influence the macroscopic properties of the resulting TSPs. Yet that does not make carbide-bound TSPs completely inferior to diamond-skeleton TSPs. Diamond-skeleton TSPs generally have superior performance than carbide-bound TSPs, but carbide-bound TSPs eliminate a processing step (the leaching), which may be time consuming or expensive. Therefore, it becomes a matter of engineering choice as to whether to use a carbide-bound TSP or a diamond-skeleton TSP. As such, both carbide-bound TSPs and diamond-skeleton TSPs are within the scope of this invention.

The annular void 514 (FIG. 5) of the TSP may be of any shape that allows projection 524 to be easily inserted without having to form projection 524 in situ. For example, flared annular region 518 and flared projection 528 may be removed, may be longer, may be more or less pronounced, may be rounded to be either concave or convex, or there may be multiple flared projections and opposing flared annular regions.

Figure 2:
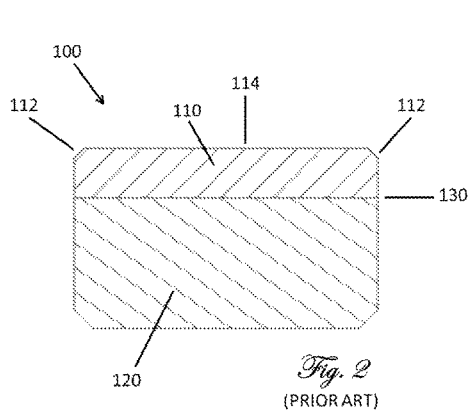
FIG. 2 is a schematic view of a conventional PDC.
Figure 3:
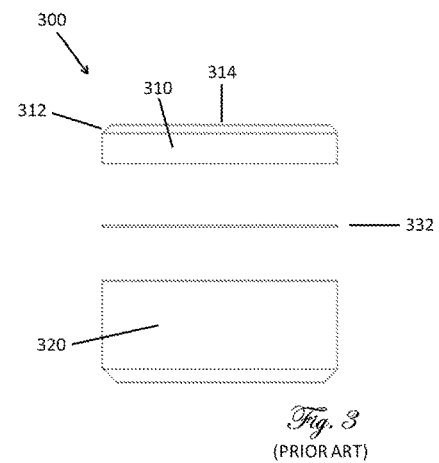
FIG. 3 is an exploded schematic view of a conventional brazed PDC.

A flank may or may not be molded or machined into the top edge of the diamond plate 500. For example, prior art FIG. 2 shows flank 112 on diamond plate 110. As would be understood by the skilled artisan, a flank is understood to have certain advantages and disadvantages in the art and use thereof is a matter of engineering choice.

A preferred TSP is a TSP formed from a diamond plate made by sintering diamond powder with a metallic binder under high temperature and high pressure that gives the resulting TSP sufficient abrasion resistance at temperatures of 700° C. or higher. Preferably the metallic binder comprises cobalt as a catalyst and is then leached to remove the catalytic cobalt after polycrystalline diamond formation by catalytically forming a coherent diamond skeleton, thereby converting the polycrystalline diamond into a diamond-skeleton TSP. In a different embodiment, silicon is preferred in the binder instead of a catalyst to create a silicon carbide binder for the diamond particles, thereby creating a carbide-bound TSP.

Multiple TSPs are not necessary for the present invention to function as intended. However, as would be understood by the skilled artisan, multiple TSPs may be used in specialized utilities.

Substrate with Projection

The substrate is generally a metallic or carbide substrate. Preferably the binder phase for the substrate is silicon, titanium, tungsten, molybdenum, niobium, tantalum, zirconium, hafnium, chromium, vanadium, scandium, boron, carbides of all of the preceding, or alloys of all of the preceding. More generally a carbide, boride or nitride from the groups IVA, VA or VIA of the periodic table can be used in addition to the already noted binder phases. Tungsten carbide is a particularly preferred material.

The substrate can be formed by any art standard molding technique. It should have a projection on a top surface that penetrates the annular void of the annular TSP to mate with the annular void.

Additionally, projection 524 (FIG. 5) may be machined separately from the rest of the substrate. Flared projection 528 may be acting as a chamfer, which helps strengthen the attachment between the projection 524 and the rest of the substrate by increasing the footprint of the connection.

The substrate serves two major purposes. First the substrate absorbs shock. In order to effectively perform this role, the substrate material should have a relatively high Young's modulus, preferably greater than 10 psi at 700° C. The second purpose is to create a manipulatable, physical link between the PDC and the rest of the tool.

Braze

The surfaces of the TSP 510 (FIG. 5) and substrate 520 facing each other are designed so that a gap ranging in thickness between 0.005 to 0.2 mm may be filled with a braze alloy 530 and maintained between the TSP 510 and the substrate 520 after the components are assembled with braze in between them. The TSP 510 and substrate 520 are also designed to facilitate the components assembly and brazing process is an efficient manner.

Figure 6:
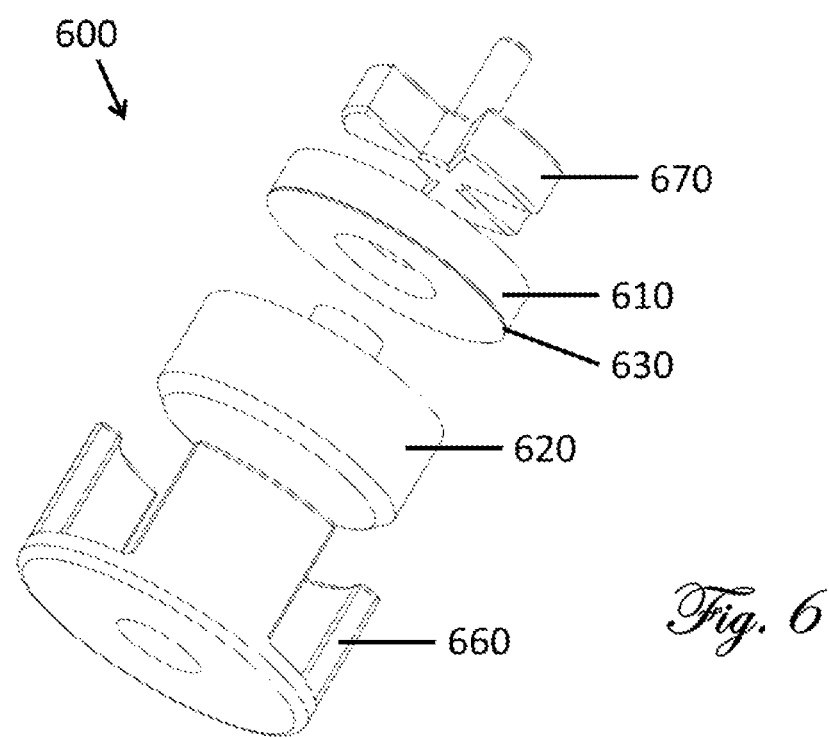
FIG. 6 shows an exploded view of an exemplary alignment system designed to assist in properly assembling the present invention.

Referring now to FIG. 6, an alignment system 600 is shown according to one aspect of the present invention. Alignment system 600 may be used to align the TSP 610 and substrate 620. The substrate 620 is placed into a cup shaped alignment fixture 660. A generous amount of braze paste 630 is applied to the TSP 610's interfacial surface. The TSP 610 with braze paste 630 is placed on top of the substrate 620. The cup shaped alignment fixture 660 will help align the two components. Once the braze paste 630 is heated, the plunger 670 is placed on top of the TSP 610. The plunger pushes down onto the TSP either by its own weight or by applying downward force onto the plunger. The TSP moves down towards the substrate until TSP surface and the substrate top surface are level. The plunger 670 is kept in place until the molten braze solidifies and the braze joint is set.

The braze alloy is generally in a paste form. Two such commercial braze pastes are recommended for these constructions: Lucas Milhaubt #BLA 50, part #HF410/40-050/80D1 ("80D1") or Lucas Milhaubt #LM 69-241 ("241"). 80D1 is recommended for diamond-skeleton TSP as it has a relatively high melting point of 850° C. 241 has a melting temperature of 750° C. and is better suited to carbide-bound PDC.

Alternatively, a braze foil may be used. Braze foil will have to be formed to match the gap between the TSP and substrate. Forming a braze foil may be performed by any art recognized methodology, but is preferably achieved using a die and punch on a mechanical or hydraulic press.

Other braze alloys can be used and can come in any form including paste, foil, and powder.

The strength of the attachment ("braze strength") between the two components depends on the strength of the braze bond and the Transverse Rupture Strength ("TRS") of substrate (about 2500 n/mm2 for tungsten carbide). The inventive configuration surprisingly forms an unexpected and substantially stronger attachment than relying on the braze joint alone. The braze strength of the present invention may be 40,000 psi, 50,000 psi, 60,000 psi, 70,000 psi, 80,000 psi, 90,000 psi or even 100,000 psi depending on which materials and which interface topology are used. The shear strength should be at least 40,000 psi. Preferably the shear strength is at least 50,000 psi. Even more preferably the shear strength is 80,000 psi. Yet even more preferably the shear strength is 100,000 psi.

Rake

In the present disclosure, "rake" refers to the top non-cutting surface of the PDC that is constantly exposed to abraded material. The rake does not cut hard rock. Instead, the rake is primarily responsible for moving cut debris away from the edge and flank so that they do not get packed with debris. Naturally the rake must resist friction heating and tolerate friction heat, abrasion from hard rock debris (hard grits) shear flow, thermal adhesion wear, thermal cracking, and thermal chipping.

The rake may be coated with a diamond or other ultra-hard coating. Such coatings when applied will improve the performance of the rake, especially for portions of the rake that are exposed substrate. However, if such a coating is applied before the PDC assembly is brazed, no further machining can be performed on those areas coated. Otherwise the applied coating will be removed.

Cutting Surfaces

The flank (if present) and the circumferential sides of the TSP of the PDC are primarily responsible for abrading the hard rock or stone to generate the cut surface of the hole or edge. These areas are exposed to less friction heat than the rake. As such, abrasion resistance (i.e., hardness) is generally emphasized other properties.

It will also be recognized by those skilled in the art that, while the invention has been described above in terms of preferred embodiments, it is not limited thereto. Various features and aspects of the above described invention may be used individually or jointly. Further, although the invention has been described in the context of its implementation in a particular environment, and for particular applications (e.g.), those skilled in the art will recognize that its usefulness is not limited thereto and that the present invention can be beneficially utilized in any number of environments and implementations where it is desirable to A, to B, to C, to D, to E. Accordingly, the claims set forth below should be construed in view of the full breadth and spirit of the invention as disclosed herein.

We claim the following:

1. A process of manufacturing a thermally stable polycrystalline diamond compact comprising:
   (a) creating a substantially annular thermally stable plate that has an interface surface;
   (b) machining a substantially cylindrical substrate that has an non-planar interface surface;
   (c) applying a braze to the interface surfaces between the plate and the substrate such that the plate and the substrate are brazed together;
   wherein the plate's interface surface is a bottom surface of the plate and the orthogonal inner annular surface, and the substrate's interface surface is a top surface of the substrate that comprises a projection that is substantially an inverted topology of plate's interface surface such that when the braze paste is applied, the two components become a mated pair with at least a portion of the substrate's top surface projecting into an inner annular region of the plate and not being mated with the plate.

2. The process of manufacturing a thermally stable polycrystalline diamond compact according to claim 1, wherein step (a) comprises:
   charging a pressure mold with an ultra-hard powder in the amount of at least 50% by volume;
   charging the pressure mold with a metallic binder or catalyst;
   sealing the mold;
   applying enough heat and pressure to the mold to melt the binder such that the binder sweeps through the ultra-hard powder and fills the powder's interstitial spaces; and
   removing the plate from the mold.

3. The process of manufacturing a thermally stable polycrystalline diamond compact according to claim 2, wherein the pressure mold is an annular pressure mold.

4. The process of manufacturing a thermally stable polycrystalline diamond compact according to claim 2, wherein the pressure mold is a cylindrical pressure mold, and wherein a step of machining a hole from one planar face of the plate to the other planar face is performed after the plate is removed from the mold.

5. The process of manufacturing a thermally stable polycrystalline diamond compact according to claim 2, wherein metallic binder or catalyst is selected from the group consisting of cobalt, a group VIII metal, or alloys thereof; and wherein a further step of leaching the metallic binder or catalyst from the plate is performed after the plate is removed from the mold.

6. The process of manufacturing a thermally stable polycrystalline diamond compact according to claim 1, wherein the binder comprises silicon.

7. The process of manufacturing a thermally stable polycrystalline diamond compact according to claim 1, wherein the braze has a shear strength of at least 40,000 psi.

8. The process of manufacturing a thermally stable polycrystalline diamond compact according to claim 1, wherein the braze has a shear strength of at least 50,000 psi.

9. The process of manufacturing a thermally stable polycrystalline diamond compact according to claim 1, wherein the braze is applied as a braze paste.

10. The process of manufacturing a thermally stable polycrystalline diamond compact according to claim 1, wherein the substrate comprises two pieces: a main substantially cylindrical portion, and the projection, wherein the projection comprises a chamfer increasing the projections footprint where it connects to the main substantially cylindrical portion.

* * * * *